(12) United States Patent
Choi et al.

(10) Patent No.: US 8,018,815 B2
(45) Date of Patent: Sep. 13, 2011

(54) MICRO-FRESNEL ZONE PLATE OPTICAL DEVICES USING DENSELY ACCUMULATED RAY POINTS

(75) Inventors: Sang H. Choi, Poquoson, VA (US); Yeonjoon Park, Yorktown, VA (US); Glen C. King, Williamsburg, VA (US); James R. Elliott, Vesuvius, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 164 days.

(21) Appl. No.: 12/490,747

(22) Filed: Jun. 24, 2009

(65) Prior Publication Data
US 2010/0118683 A1   May 13, 2010

Related U.S. Application Data

(60) Provisional application No. 61/089,218, filed on Aug. 15, 2008.

(51) Int. Cl.
*G11B 7/00*   (2006.01)
(52) U.S. Cl. .................................... 369/112.03
(58) Field of Classification Search ............... 369/44.26, 369/109.01, 112.01, 112.03, 112.2; 359/565, 359/569
See application file for complete search history.

(56) References Cited

U.S. PATENT DOCUMENTS

| | | | |
|---|---|---|---|
| 3,454,338 A | | 7/1969 | Girard et al. |
| 3,603,685 A | * | 9/1971 | Heflinger et al. ............ 356/458 |
| 3,649,837 A | | 3/1972 | Lehovec |
| 4,429,411 A | | 1/1984 | Smither |
| 4,572,616 A | | 2/1986 | Kowel et al. |
| 4,743,083 A | | 5/1988 | Schimpe |
| 4,775,967 A | * | 10/1988 | Shimada et al. ............ 369/44.26 |
| 4,822,148 A | | 4/1989 | Agostinelli et al. |
| 4,909,626 A | | 3/1990 | Purvis et al. |
| 4,995,714 A | | 2/1991 | Cohen |
| 5,011,284 A | | 4/1991 | Tedesco et al. |
| 5,071,253 A | * | 12/1991 | Chase .......................... 359/245 |
| 5,121,378 A | * | 6/1992 | Hirose et al. ............. 369/112.28 |
| 5,204,516 A | | 4/1993 | Opheij |
| 5,268,973 A | | 12/1993 | Jenevein |
| 5,357,591 A | | 10/1994 | Jiang et al. |

(Continued)

OTHER PUBLICATIONS

N. Kitaura et al.. Sprectrometer Employing a micro-Fresnel Lens, Optical Engineering 34, 584-588 (1995).

(Continued)

*Primary Examiner* — Wayne Young
*Assistant Examiner* — Brenda Bernardi
(74) *Attorney, Agent, or Firm* — Thomas K. McBride, Jr.; Robin W. Edwards

(57) ABSTRACT

An embodiment generally relates to an optical device suitable for use with an optical medium for the storage and retrieval of data. The optical device includes an illumination means for providing a beam of optical radiation of wavelength λ and an optical path that the beam of optical radiation follows. The optical device also includes a diffractive optical element defined by a plurality of annular sections. The plurality of annular sections having a first material alternately disposed with a plurality of annular sections comprising a second material. The diffractive optical element generates a plurality of focal points and densely accumulated ray points with phase contrast phenomena and the optical medium is positioned at a selected focal point or ray point of the diffractive optical element.

8 Claims, 5 Drawing Sheets

U.S. PATENT DOCUMENTS

| | | | |
|---|---|---|---|
| 5,360,973 | A | 11/1994 | Webb |
| 5,731,874 | A | 3/1998 | Maluf |
| 5,793,488 | A | 8/1998 | Kulawiec et al. |
| 5,986,758 | A | 11/1999 | Lyons et al. |
| 5,995,221 | A | 11/1999 | Slutter et al. |
| 6,167,016 | A | 12/2000 | Block et al. |
| 6,226,083 | B1 | 5/2001 | Schwerzel et al. |
| 6,269,066 | B1* | 7/2001 | Chase ............................ 369/126 |
| 6,335,625 | B1 | 1/2002 | Bryant et al. |
| 6,366,547 | B1* | 4/2002 | Chase ....................... 369/112.01 |
| 6,452,675 | B1 | 9/2002 | Muller et al. |
| 6,509,559 | B1 | 1/2003 | Ulrich et al. |
| 6,583,873 | B1 | 6/2003 | Goncharov et al. |
| 6,597,452 | B1 | 7/2003 | Jiang et al. |
| 6,643,065 | B1 | 11/2003 | Silberman |
| 6,762,839 | B2 | 7/2004 | Zeylikovich et al. |
| 6,777,656 | B2 | 8/2004 | Narita et al. |
| 6,785,201 | B2* | 8/2004 | Shinohara et al. ......... 369/44.17 |
| 6,847,447 | B2 | 1/2005 | Ozanich |
| 6,856,406 | B2* | 2/2005 | Chase ........................... 356/519 |
| 6,947,453 | B2 | 9/2005 | Sidorin |
| 6,995,840 | B2 | 2/2006 | Hagler |
| 7,072,442 | B1 | 7/2006 | Janik |
| 7,084,972 | B2 | 8/2006 | Treado |
| 7,106,664 | B2* | 9/2006 | Hasegawa et al. ......... 369/13.33 |
| 7,161,673 | B2 | 1/2007 | DaSilva |
| 7,196,791 | B2 | 3/2007 | Johansen et al. |
| 7,253,958 | B2 | 8/2007 | Aizenberg et al. |
| 7,262,917 | B2 | 8/2007 | Yang et al. |
| 7,630,287 | B2* | 12/2009 | Oumi et al. .............. 369/112.01 |
| 7,872,959 | B2* | 1/2011 | Kimura et al. ........... 369/112.23 |
| 2001/0046276 | A1 | 11/2001 | Schneider et al. |
| 2004/0032585 | A1 | 2/2004 | Johansen et al. |
| 2004/0175174 | A1 | 9/2004 | Suhami |
| 2007/0109924 | A1 | 5/2007 | Takahashi et al. |
| 2007/0164842 | A1 | 7/2007 | Koenig |
| 2007/0165221 | A1 | 7/2007 | Deck et al. |
| 2008/0020480 | A1 | 1/2008 | Lin et al. |
| 2008/0094631 | A1 | 4/2008 | Jung et al. |
| 2008/0119060 | A1 | 5/2008 | Goodwin |
| 2009/0161520 | A1* | 6/2009 | Hendriks ................. 369/112.01 |

OTHER PUBLICATIONS

Y. H. Fan et al., Switchable Fresnel Lens Using Polymer-stabilized Liquid Crystals, Optics Express 11, 3080-3086 (2003).

M. Honma and T. Nose, Liquid-Crystal Fresnel Zone Plate Fabricated by Microrubbing, Japanese Journal of Applied Physics Part 1-Regular Papers Short Notes & Review Papers 44, 287-290 (2005).

T. H. Lin et al., Polarization Controllable Fresnel Lens Using Dye-doped Liquid Crystals, Optics Express 14, 2359-2364 (2006).

Y. Saito et al., Laser-induced Fluorescence imaging of Plants Using a Liquid Crystal Tunable Filter and Charge Coupled Device Imaging Camera, Review of Scientific Instruments 76, 106103 (2005).

J. Y. Hardeberg, et al., Multispectral Color Image Capture Using a Liquid Crystal Tunable Filter, Optical Engineering 41, 2532-2548 (2002).

Y. Park et al., Miniaturization of a Fresnel Spectrometer, Pure Appl. Opt. 10 (2008) 095301.

P. Montgomery et al., The metrology of miniature FT spectrometer MOEMS device using white light scanning interference microscopy, Thin Solid Films 450, 79-83 (2004).

* cited by examiner

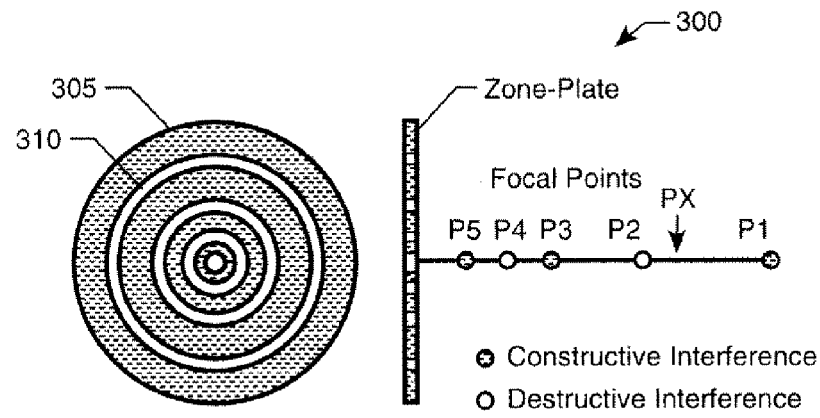
Fig. 3
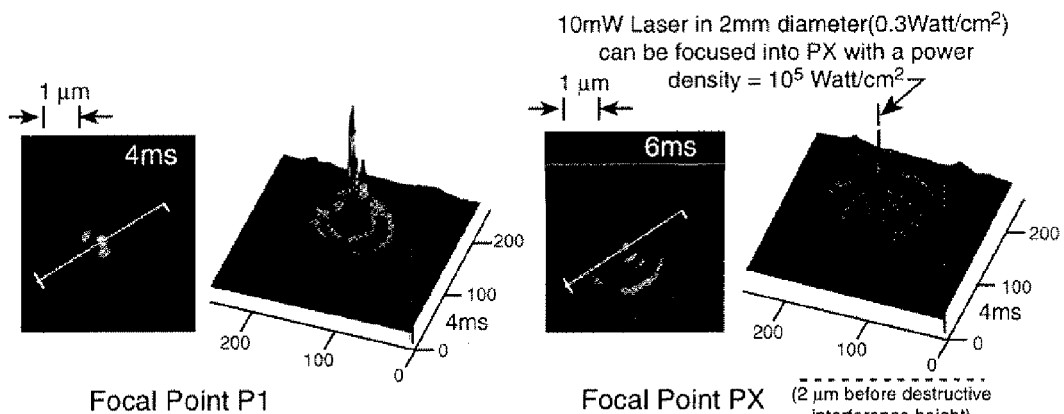
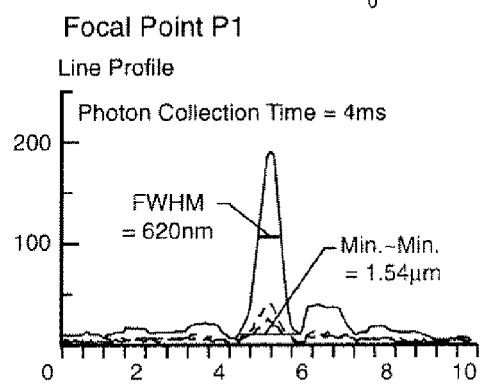
Fig. 4A
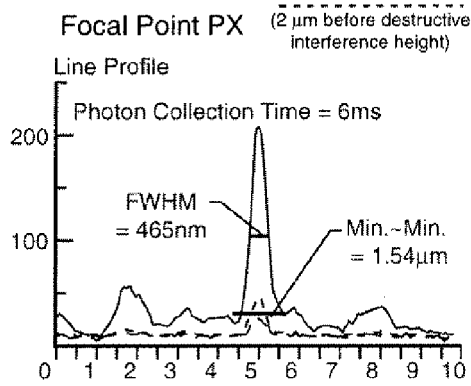
Fig. 4B

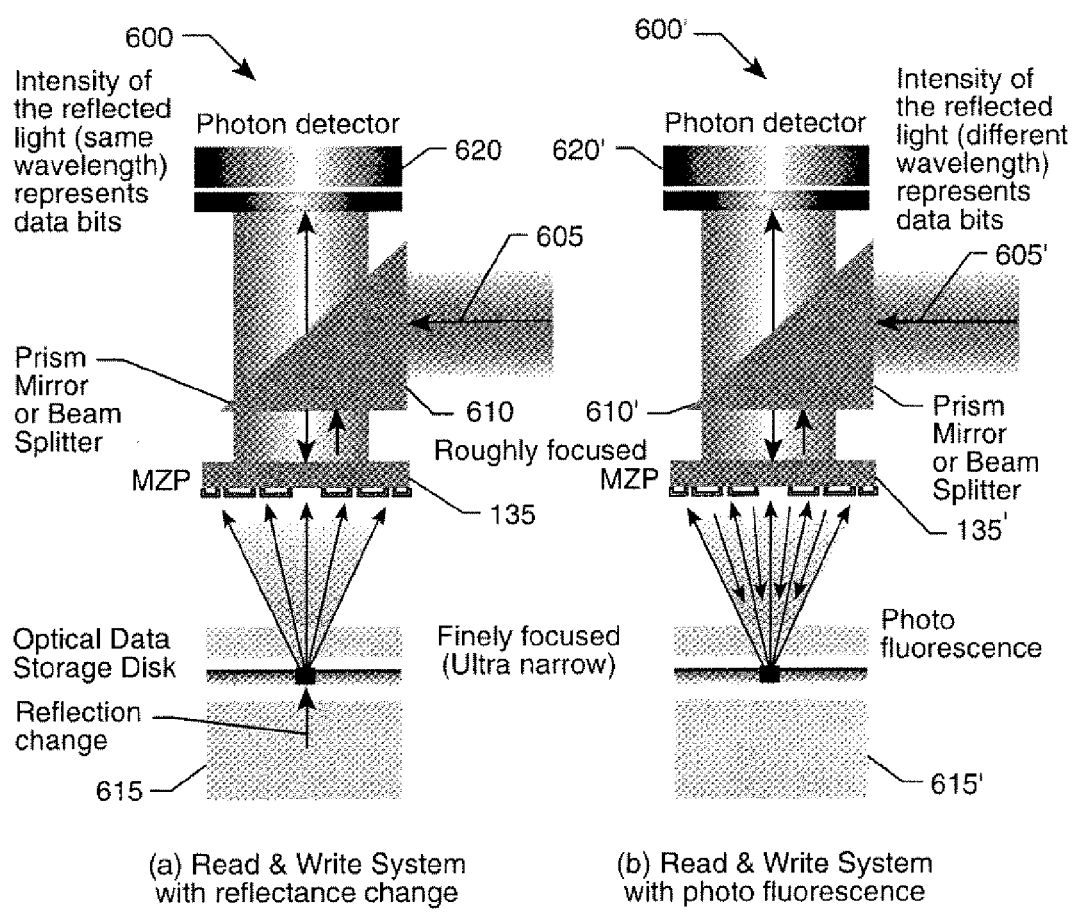
Fig 6A — (a) Read & Write System with reflectance change
Fig 6B — (b) Read & Write System with photo fluorescence

MICRO-FRESNEL ZONE PLATE OPTICAL DEVICES USING DENSELY ACCUMULATED RAY POINTS

CROSS-REFERENCE TO RELATED APPLICATIONS

This patent application claims the benefit of U.S. Provisional Patent Application No. 61/089,218 filed Aug. 15, 2008.

ORIGIN OF THE INVENTION

The invention was made by employees of the United States Government and may be manufactured and used by or for the Government of the United States of America for governmental purposes without the payment of any royalties thereon or therefor.

FIELD OF THE INVENTION

This invention relates generally to optical data storage systems, more particularly, to a micro-Fresnel zone plate optical device for the optical data storage systems.

DESCRIPTION OF THE RELATED ART

In recent years, various kinds of optical recording media have been under development, and optical pickup apparatus which can carry out recording and reproducing while using a plurality of kinds of optical recording media in common have been known. For example, a system which carries out recording and reproducing of DVD±R/RW (recordable digital versatile disc) and CD-R/RW (recordable optical disc) by using an optical pickup device has been known, FIG. 7 illustrates a conventional optical or magneto-optic disk drive 700. As shown in FIG. 7, the optical disk drive 700 includes a laser source 705 for providing a laser beam 710, an optical or magneto-optic data recording disk 715, and a lens 720 for focusing the laser 710 on a small spot on disk 715. A motor 725 rotates disk 715 so that laser beam 710 can scan over a data recording track of the disk 715.

The focusing lens 720, usually a convex lens, is a few millimeters to a few centimeters in diameter with a long focal distance, from several millimeters to several centimeters. The spot size of a laser beam is limited by the beam waist of a Gaussian beam profile at a conventional focal point of a lens and it is very difficult to reduce the spot size substantially below the wavelength over the numerical aperture of the lens. Therefore, the beam-spot-size of conventional commercially available technologies is relatively large and could not achieve the higher data density beyond four point seven (4.7) gigabyte per single layer DVD and about twenty five gigabyte per single layer blue-ray DVD in the year 2005. In optical and magneto-optic data storage, one also generally strives for high data recording density. This means that the spot size produced by the focusing lens should be as small as possible.

SUMMARY

An embodiment generally relates to an optical device suitable for use with an optical medium for the storage and retrieval of data. The optical device includes an illumination means for providing a beam of optical radiation of wavelength λ and an optical path that the beam of optical radiation follows. The optical device also includes a diffractive optical element that includes a plurality of annular sections. The plurality of annular sections is defined by a first material alternately disposed with a plurality of annular sections comprising a second material. The diffractive optical element generates a plurality of focal points and the optical medium is positioned at a selected focal point or densely accumulated ray-point of the diffractive optical element.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3 illustrates the multiple focal points of the micro zone plate shown in FIGS. 1 and 2 in accordance with yet another embodiment.

FIG. 4A illustrates a power density for a focal point of the micro zone plate with a constructive-interference in accordance with yet another embodiment;

FIG. 4B illustrates a power density for a densely accumulated ray-point (non-conventional focal point) of the micro zone plate in accordance with yet another embodiment;

FIG. 6A illustrates a system for a medium based on reflection in accordance with yet another embodiment;

FIG. 6B illustrates a system for a medium based on a photoluminescence medium.

DETAILED DESCRIPTION OF EMBODIMENTS

Figure 1:
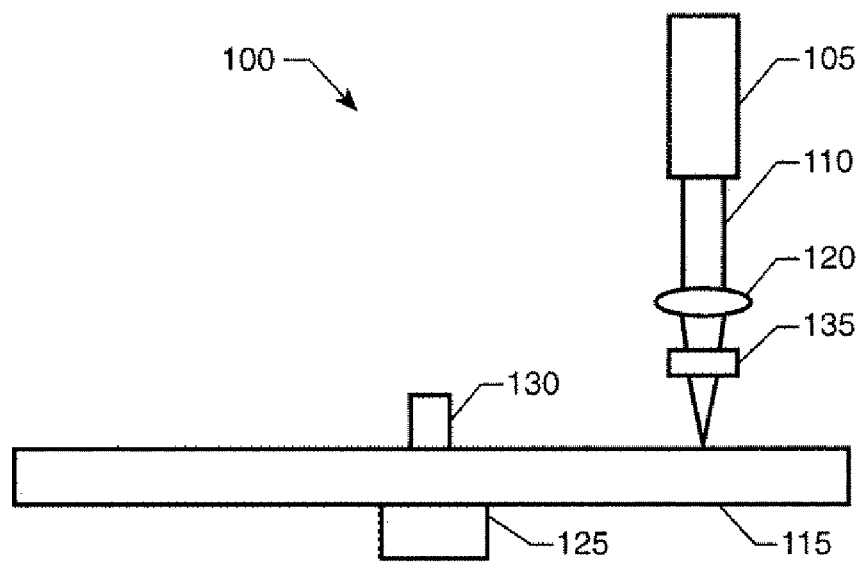
FIG. 1 illustrates an exemplary system in accordance with an embodiment of the present invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of optical systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to an improved optical recording and pick-up device for use in optical storage systems. More particularly, a micro Fresnel zone plate may be fabricated using photonic DART (Densely Accumulated Ray-poinT) technology in which the central focused spot is sharpened by one or multiples of surrounding destructive interference ring patterns. The conventional micro Fresnel zone plate with zero-order transparent central aperture may create multiple constructive focal points described by $r_n = K\sqrt{n}$ (n is an odd integer, 1,3,5 . . .) when the radii of the circles on the zone-plate are given in the form of, and constructive focal points F1, F3 and F5 are $K^2/\lambda$, $K^2/(3\lambda)$, and $K^2/(5\lambda)$. In contrast, densely accumulated ray-point of photonic DART occurs at different position close to destructive interference distance where the central bright spot is surrounded by destructive interference rings. The result is an ultra-sharp bright spot caused by phase-contrast mode. The full-width-half-maximum (FWHM) of this ultra-sharp bright spot, i.e. photonic DART, is narrower than that of a Gaussian distribution as shown in FIG. 4B. The photonic DART occurs between the constructive interference point, such as $K^2/\lambda$ and next destructive interference point, $K^2/2\lambda$. The focal distance of DART is close to the destructive interference point, and it is not expected in conventional constructive focal points.

DART occurs at $K^2/X\lambda$, where X is not an integer, but X is close to a destructive integer so that the destructive ring pattern surrounds the central bright spot. The focused power at DART is sufficient to melt tiny objects at tiny region, e.g., the surface of an optical storage medium. The optical storage medium may be implemented as a dye-based medium, a phase-change medium, or a phase-change media. Accordingly, this DART technology may be used in optical systems for read and write operations.

Other embodiments pertain generally to an electro-optic layer integrated with the micro Fresnel zone plate implemented with photonic DART technology. The integrated electro-optic layer provides a mechanism to modify the focal points of the micro Fresnel zone plate with applied voltages. Accordingly, these embodiments can quickly track the target data track on the rotating or moving storage medium to compensate for unwanted vibration and/or wobbling.

FIG. 1 illustrates an exemplary optical system 100 in accordance with an embodiment. It should be readily apparent to those of ordinary skill in the art that the optical system 100 depicted in FIG. 1 represents a generalized schematic illustration and that other components may be added or existing components may be removed or modified.

As shown in FIG. 1, optical system 100 includes a laser source 105 for providing a laser beam 110 of a wavelength. The laser source 105 may be implemented with semiconductor lasers, discrete devices or combinations thereof. The wavelength, $\lambda$, of the laser source may be selected based on a variety of factors such as the storage medium, the application of the optical system, etc. For example some lasers for compact disc players may operate at 780 nm wavelength. Lasers for digital versatile discs may operate at 650 nm wavelength.

The optical system 100 also includes an optical or magneto-optic data recording disk 115, and a lens 120 for focusing the laser 110 on a small spot on disk 115. A motor 125 rotates disk 115 positioned on a spindle 130 so that laser beam 110 can scan over a data recording track of the disk 115.

The optical system also includes a micro Fresnel optical lens or micro zone plate (MZP) 135. The Fresnel optical lens 135 may be implemented in flat disk or 3D-structure with opaque or transparent annular structures, which are optimized for photonic DART technology, where the central bright spot is sharpened by surrounding destructive interference rings. The MZP 135, like conventional Fresnel zone plates, may generate integer constructive interference points, i.e., constructive focal points P1, P3, and P5, as well as integer destructive interference points, i.e., deconstructive focal points P2 and P4. The MZP 135 also generates a non-conventional densely accumulated ray-point, PX, somewhere between the P1 and P2 focal points as a result of the photonic DART technology. The photon distribution at PX is substantially sharper with narrower FWHM than at P1, which provides another distance to place storage media.

Figure 2:
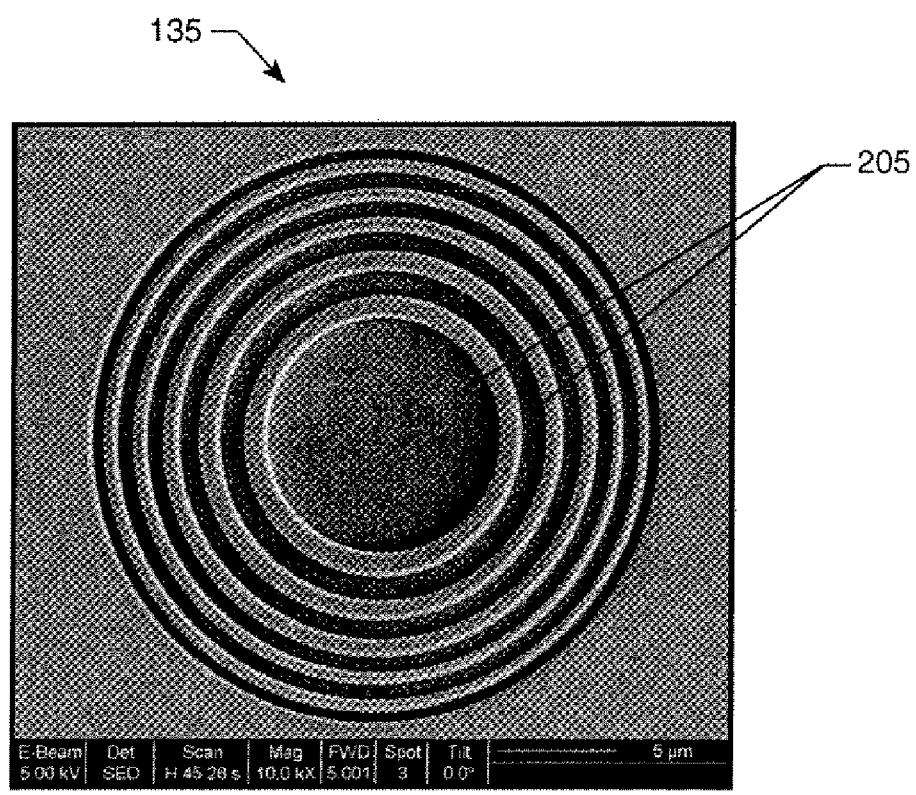
FIG. 2 illustrates a more detailed view of the micro zone plate in accordance with another embodiment.

FIG. 2 illustrates a fabricated MZP 135 in accordance with an embodiment and FIG. 3 illustrates schematically the fabricated MZP 135 of FIG. 2. As shown in FIG. 3, the MZP 135 comprises a pattern of alternating opaque 305 and transparent 310 concentric (annular or circular sections) regions. The opaque 305 concentric regions can be replaced with second transparent regions of a certain refractive index which is different from that of the first transparent 310 concentric (annular or circular sections) regions. The opaque 305 concentric regions can be replaced with third transparent regions of a certain thickness which is different from that of the first transparent 310 concentric (annular or circular sections) regions. The radius and width of the concentric rings are designed to give best focal point or ray-point, i.e. optimize the phase contrast of DART so that FWHM of focus spot becomes smallest while maintaining the intensity of focus spot. The MZP 135 uses diffraction to focus the light that passes through it. In other words, the pattern of concentric rings creates a diffraction pattern that has its largest maximum at the first diffractive order (n=1). The MZP 135 also creates higher-order diffractive orders on each side of the first order (n=3, n=5, etc.). Each of these higher-order diffractive orders is less intense than the first order diffractive order by a factor of $1/n^2$. These odd-integer diffractive orders are constructive interference focal points, i.e., P1, P3 and P5. The MZP 135 also creates destructive focal points, P2 and P4. It is worth noting that when the light provided to a zone plate is perfectly collimated, the first order of diffraction will be found at the focal length of the zone plate 135.

In this embodiment in FIG. 2, the constructive focal points are P1, P3 and P5 at a respective distance of 46.99 µm, 9.40 µm, 5.22 µm; and the destructive focal points P2 and P4 at a respective distance of 15.66 µm and 6.71 µm.

Returning to FIG. 2, the MZP 135 may be integrated with an electro-optic layer 205 that changes the refractive index according to the applied electric field. Electro-optic layer 205 can be made with electro-optic crystals, electro-optic polymers, and/or liquid crystals, but not limited to, by means of chemical vapor deposition, thin-film growth, liquid spin-coating process and so on. With the electro-optic layer 205, the MZP 135 may be configured to control the focal points with applied voltages to the electro-optic layer 205. The voltages can be applied to the concentric rings when the rings are made with metal or transparent conductor such as indium tin oxide (ITO). The resulting circular electric filed generates concentric radial gradient or stepped refractive index. Also, the planar electric filed can be generated when an underlying electrode layer is provided.

FIGS. 4AB illustrate the photon distribution at the focal point P1 (FIG. 4A) and ray-point PX (FIG. 4B). The measured full width half maximum (FWHM) at P1 is 620 nm and the FWHM at PX is 465 nm. In other words, if a few tens of mWatt laser of 2 mm diameter (>0.3 Watt/cm$^2$) is finely focused in ray-point PX so that ten mWatt is focused within 465 nm diameter, then the power density at focal point PX is about 100,000 Watt/cm$^2$, which is powerful enough to melt tiny objects at that point as well as focusing the laser beam into a spot which is smaller than the wavelength of the laser in terms of FWHM. This power can be used to burn a tiny spot, induce photo/thermo chemical reactions, melt a crystal into amorphous phase, and anneal an amorphous material into crystalline phase, such as phase-change materials. Accordingly, information can be stored as depicted by the embodiments shown in FIGS. 5AB.

Figure 5A:
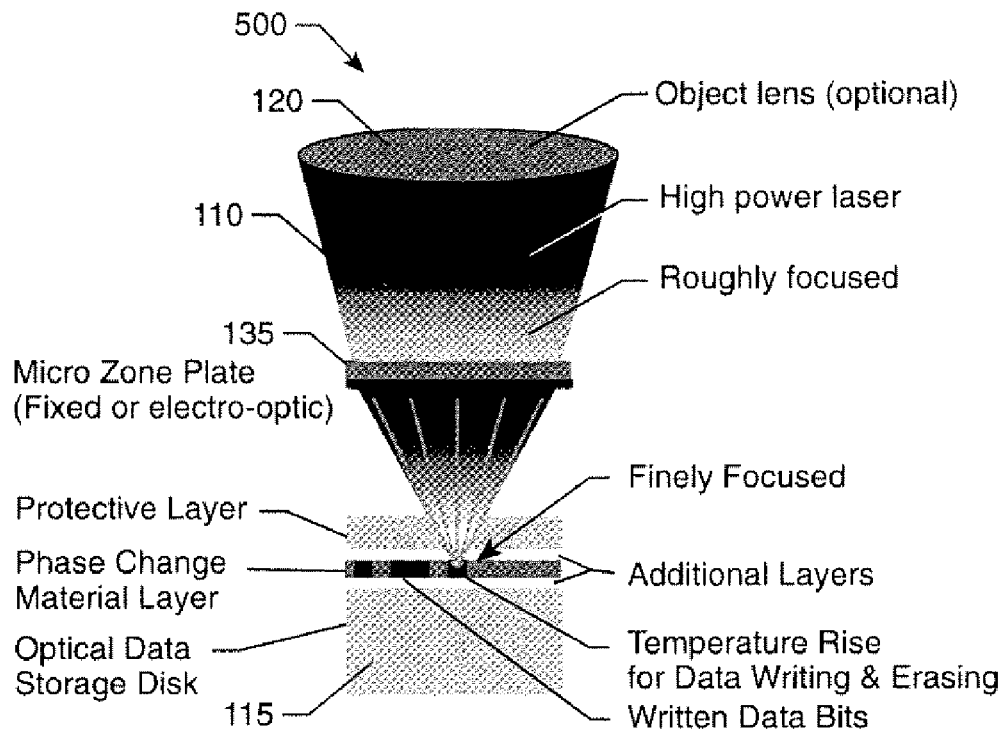
FIG. 5A illustrates a more detailed view of the system 100 in a write mode in accordance with yet another embodiment.
Figure 5B:
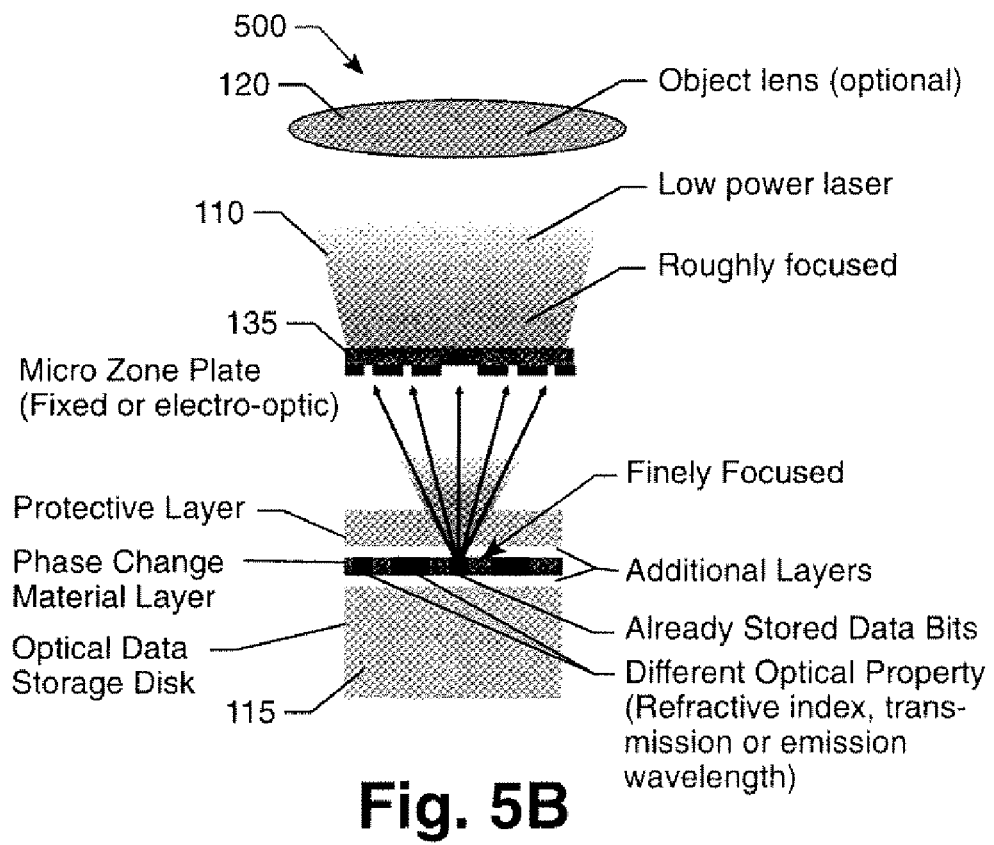
FIG. 5B illustrates a more detailed view of the system 100 in a read mode in accordance with yet another embodiment.
Figure 7:
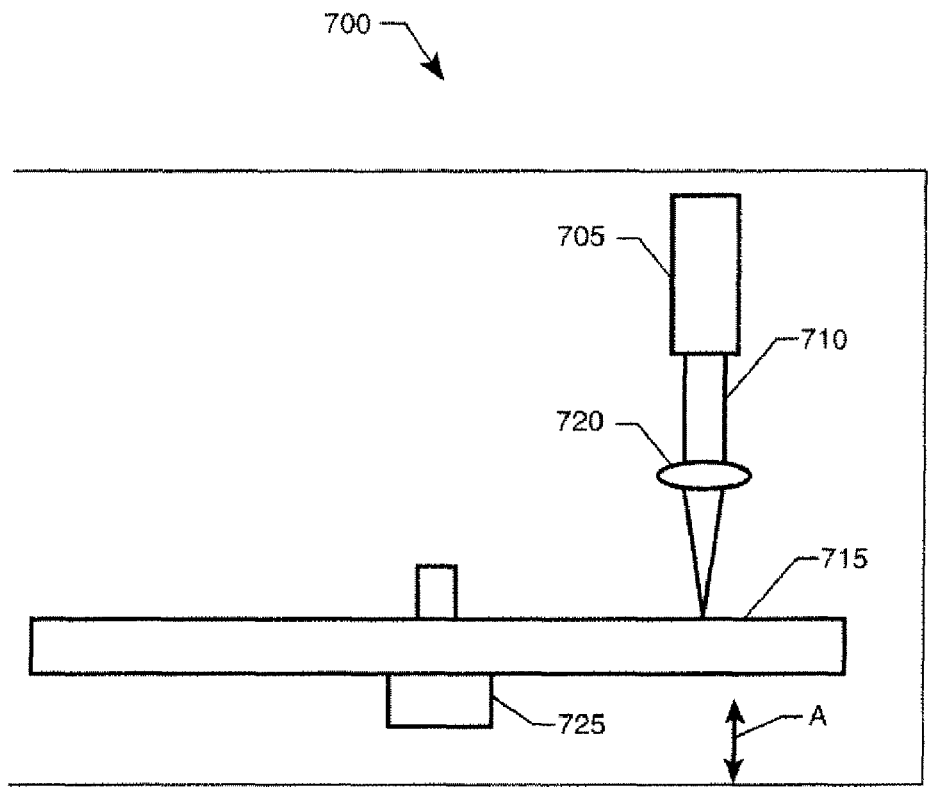
FIG. 7 illustrates a conventional optical disk drive.

FIGS. 5AB illustrate a more detailed view of the laser and storage media interaction for writing (FIG. 5A) and reading (FIG. 5B). As shown in FIG. 5A, the MZP 135 (see Micro Zone Plate 135) may receive roughly focused light from a high power laser beam (e.g. laser beam 110 in FIG. 1) through an optional focusing lens (e.g., lens 120 in FIG. 1) onto the MZP 135. The MZP 135 may finely focus the light onto the optical disk storage disk (e.g., storage media 115 in FIG. 1).

By placing the storage media at a focal point, e.g., P1 or PX, the power density at this focal point can cause a phase change to indicate a written bit. The power density may be sufficient to raise temperatures for data writing and erasing. Moreover, embodiments of the MZP 135 provide a mechanism to have substantially short focal distances as compared to conventional optical disk systems. For example, for the embodiment depicted in FIG. 2, the focal distance may be 47 μm for P1. The short focal distance can reduce the beam waist and beam spot diameter. Accordingly, a higher density of data can be written and read. Additionally, DART technology, i.e. the beam-spot-sharpness improvement by phase-contrast mode with surrounding destructive interference rings, can be used to reduce the spot-size and increase the data storage density.

Turning to FIG. 5B, the MZP 135 may receive roughly focused light from a low power laser beam (e.g. laser beam 110 in FIG. 1) through an optional focusing lens (e.g., lens 120 in FIG. 1) onto the MZP 135. The MZP 135 may finely focus the light onto the optical disk storage disk (e.g., storage media 115 in FIG. 1), which is returned back through the MZP 135. The mechanism of returned light may be a function of the property of the storage media. For example, depending on the material. the returned light may be due to refractive index, transmission or emission wavelength. Similarly, the transmitted light through a semi-transparent storage media can be used as well.

FIG. 6A illustrates an exemplary optical system 600 for a reflectance change material as the storage medium. As shown in FIG, 6A, the roughly focused laser beam 605 may hit a prism mirror (or beam splitter) 610, which reflects the laser beam 605 onto the MZP 135. The MZP 135 may focus the light at the focal distance P1 or PX on the optical data storage disk 615. Since the light from the MZP 135 is focused on a spot that can be substantially smaller than the optical characteristic size, the wavelength of the laser beam 605 over the numerical aperture of the lens, in terms of FWHM, the data storage density is substantially larger than conventional optical storage systems. The reflected light from the optical data storage disk 615 is reflected toward a photon detector 620. The intensity of the reflected light (same wavelength) may represent data bits. Similarly, the transmitted light through a semi-transparent data storage media can be used as well. In this case, the intensity of the transmitted light (same wavelength) may represent data bits.

FIG. 6B illustrates an exemplary optical system 600' for a storage medium implemented with a photo fluorescence material. As shown in FIG. 6A, the roughly focus laser beam 605' may hit a prism mirror (or beam splitter) 610', which reflects the laser beam 605' onto the MZP 135'. The MZP 135' may focus the light at the focal distance PI or PX on the optical data storage disk 615' implemented with photo-fluorescence material. Since the light from the MZP 135' is focused on a spot that is smaller than the wavelength of the laser beam 605' in terms of FWHM, the density of the data is substantially larger than conventional optical storage systems. The reflected light from the optical data storage disk 615' is reflected toward a photon detector 620'. The intensity of the reflected light (at different wavelengths) may represent data bits. Similarly, the transmitted light through a semi-transparent data storage media can be used as well. In this case, the intensity of the transmitted light (whose wavelength is different from incident laser) may represent data bits.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed as new and desired to be secured by Letters Patent of the United States is:

1. An optical device suitable for use with an optical medium for the storage and retrieval of data, the optical device comprising:
    an illumination means for providing a beam of optical radiation of wavelength λ;
    an optical path that the beam of optical radiation follows; and
    a single planar diffractive optical element configured to comprise a plurality of annular sections comprising a first material alternately disposed with a plurality of annular sections comprising a second material or a different thickness of the first material, wherein the diffractive optical element is configured to generate a plurality of diffractive focal points and a plurality of densely accumulated ray points on an optical axis away from the diffractive optical element; and
    an optical medium positioned at a selected densely accumulated ray point which is surrounded by one or multiple of zero-light-intensity destructive interference ring patterns that are located near the optical axis away from the diffractive optical element.

2. The optical device of claim 1, wherein the first material is transparent with a first refractive index.

3. The optical device of claim 2, wherein the second material is transparent with a second refractive index or is opaque.

4. The optical device of claim 1, wherein at least one focal length of the diffractive optical element is longer than wavelength λ and shorter than ten centimeters.

5. The optical device of claim 1, wherein the plurality of diffractive focal points comprises integer constructive interference focal points, integer destructive interference focal points and a non-integer densely accumulated ray point.

6. The optical device of claim 1, further comprising an electro-optic layer that changes the refractive index when an electric field is applied to modulate the respective distances of the plurality of diffractive focal points.

7. The optical device of claim 6, wherein the electro-optic layer is configured to be implemented with one of an electro-optic crystal, an electro-optic polymer, and a liquid crystal.

8. The optical device of claim 1, wherein the storage medium is one of dye-based medium, a phase-change medium, and a photo-luminescence medium.

* * * * *